(12) United States Patent
Näslund

(10) Patent No.: US 12,427,482 B2
(45) Date of Patent: Sep. 30, 2025

(54) MEMBRANE DISTILLER AND OPERATION METHOD THEREFORE

(71) Applicant: Nanosized Sweden AB, Uppsala (SE)

(72) Inventor: Harald Näslund, Stockholm (SE)

(73) Assignee: NANOSIZED SWEDEN AB, Uppsala (SE)

( * ) Notice: Subject to any disclaimer, the term of this patent is extended or adjusted under 35 U.S.C. 154(b) by 656 days.

(21) Appl. No.: 17/783,157

(22) PCT Filed: Dec. 9, 2020

(86) PCT No.: PCT/SE2020/051183
§ 371 (c)(1),
(2) Date: Jun. 7, 2022

(87) PCT Pub. No.: WO2021/118440
PCT Pub. Date: Jun. 17, 2021

(65) Prior Publication Data
US 2023/0009754 A1    Jan. 12, 2023

(30) Foreign Application Priority Data
Dec. 10, 2019    (SE) .................... 1951421-5

(51) Int. Cl.
*B01D 61/36* (2006.01)
*B01D 65/02* (2006.01)
(Continued)

(52) U.S. Cl.
CPC ......... *B01D 61/366* (2013.01); *B01D 61/364* (2013.01); *B01D 65/02* (2013.01);
(Continued)

(58) Field of Classification Search
None
See application file for complete search history.

(56) References Cited

U.S. PATENT DOCUMENTS

| 4,952,751 A | 8/1990 | Blume et al. |
| 4,953,694 A | 9/1990 | Hayashi et al. |

(Continued)

FOREIGN PATENT DOCUMENTS

| CN | 101600492 | 12/2009 |
| CN | 102107120 | 6/2011 |

(Continued)

OTHER PUBLICATIONS

English Translation of Patent Search Report for Russian Patent Application No. 2022118255/07 dated Mar. 5, 2024 (2 pages).
(Continued)

*Primary Examiner* — Peter Keyworth
(74) *Attorney, Agent, or Firm* — Fox Rothschild LLP; Carol E. Thorstad-Forsyth

(57) ABSTRACT

An air channel membrane distiller (1) comprises a hot surface (12), a cooling section (20) and a hydrophobic membrane (30). The hot surface and the hydrophobic membrane define a sealed evaporation channel (40). A surface (22) of the cooling section and the hydrophobic membrane define a sealed condensation channel (50). A water supply tubing (42) is connected to the evaporation channel. A water discharge tubing (46) is connected to the evaporation channel. A purified-water discharge tubing (56) is connected to the condensation channel. The surface of the cooling section is given a temperature lower than a temperature of water in the evaporation channel. A gas supply arrangement (60) for inert gas comprises a heater (62). A gas pipe system (64) is arranged to a gas inlet (55) of the condensation channel for enabling flushing of at least the condensation channel with the inert gas.

20 Claims, 13 Drawing Sheets

(51) Int. Cl.
*B01D 69/02* (2006.01)
*C02F 1/44* (2023.01)
*C02F 103/04* (2006.01)

(52) U.S. Cl.
CPC .............. *B01D 69/02* (2013.01); *C02F 1/447* (2013.01); *B01D 2221/14* (2013.01); *B01D 2313/12* (2013.01); *B01D 2313/16* (2013.01); *B01D 2313/22* (2013.01); *B01D 2313/26* (2013.01); *B01D 2313/70* (2022.08); *B01D 2321/18* (2013.01); *B01D 2321/32* (2013.01); *B01D 2325/02833* (2022.08); *B01D 2325/38* (2013.01); *C02F 2103/04* (2013.01); *C02F 2201/002* (2013.01)

(56) References Cited

U.S. PATENT DOCUMENTS

| | | |
|---|---|---|
| 2007/0169625 A1 | 7/2007 | Aines et al. |
| 2014/0048482 A1 | 2/2014 | Ichikawa et al. |
| 2015/0218018 A1 | 8/2015 | Lee et al. |
| 2016/0107121 A1 | 4/2016 | Lienhard et al. |
| 2017/0023239 A1 | 1/2017 | Cullen |
| 2017/0173536 A1 | 6/2017 | Nagata et al. |
| 2017/0232391 A1 | 8/2017 | Wenzel et al. |
| 2020/0109070 A1 | 4/2020 | Hashimoto et al. |

FOREIGN PATENT DOCUMENTS

| | | |
|---|---|---|
| CN | 105121036 | 12/2015 |
| CN | 106659944 | 5/2017 |
| CN | 207102355 U | 3/2018 |
| CN | 107106986 B | 10/2020 |
| JP | S62180790 | 8/1987 |
| JP | 201334969 | 2/2013 |
| JP | 2019-107647 | 7/2019 |
| KR | 20130073836 | 7/2013 |
| KR | 20170123487 A | 11/2017 |
| RU | 2612701 | 3/2017 |
| TW | 559567 B | 11/2003 |
| TW | 201323069 A | 6/2013 |
| WO | 2008054207 | 5/2008 |
| WO | 2012/147534 | 11/2012 |
| WO | 2013021966 | 2/2013 |
| WO | 2014127304 | 8/2014 |
| WO | 2017164440 | 9/2017 |
| WO | 2018/174279 | 9/2018 |

OTHER PUBLICATIONS

International Search Report issued in PCT/SE2020/051183 dated Jan. 21, 2021.
Supplementary European Search Report for European Patent Application No. 20 89 8269, dated Sep. 14, 2023 (2 pages).
Xu Tongwen, "Membrane distillation," Membrane Chemistry and Technology Tutorial, Science and Technology of China, Shu University Press, 4 pages (2003).

MEMBRANE DISTILLER AND OPERATION METHOD THEREFORE

RELATED APPLICATION DATA

The present application is a National Phase of International Patent Application No. PCT/SE2020/051183, which was filed on Dec. 9, 2020, entitled "MEMBRANE DISTILLER AND OPERATION METHOD THEREFORE" and claims priority to Sweden Patent Application No. 1951421-5 which was filed on Dec. 10, 2019. The contents of these applications are incorporated herein by reference in its entirety.

TECHNICAL FIELD

The present technology refers in general to devices and methods for production of clean water and in particular to membrane distillers and methods for operation of membrane distillers.

BACKGROUND

In semiconductor production, wafers are treated in a series of stages along a production line. In some locations along the productions line, washing steps are included for cleaning the wafer with ultrapure water.

There are requests for allowing smaller and smaller structures on the wafers for admitting faster, less expensive and energy saving electronics solutions. However, applying smaller linewidth of the electronics of the wafers also calls for a more efficient washing, since even very small contaminations may cause malfunction of the circuits e.g. by short-circuiting. The standard method to meet such requests has been to use larger and larger volumes of ultrapure water for washing purposes. The large volumes of water have become a problem in the semiconductor industry, in particular the need for producing the large volumes ultra-pure water, but also in the respect of handling the large amounts of used washing water. The water that has been used for washing purposes may comprise hazardous substances and should be taken care of in an appropriate manner.

Typically, different kinds of filters and deionizing equipment have been used for producing these large volumes of washing water. In a typical scenario, a large central ultrapure water production unit is provided adjacent to the clean-room production areas and the produced water is transported in pipes to the sites where the washing takes place.

When going to smaller line-width production of semiconductors, there is a problem of providing proper washing and to handle the large water volumes.

In the published US patent application US 2017/023239 A1, a process for the regeneration of a membrane wall in a distillation apparatus is disclosed. A distillation apparatus has a plurality of evaporation and condensation stages. Each evaporation and condensation stage has a flow channel conducting a liquid. The flow channel is confined by a vapor-permeable and liquid-impermeable membrane wall, wherein vapor emerging from the liquid passes through the membrane wall. The liquid is removed from the flow channel. After the removal of the liquid, the membrane wall is surrounded on both sides by a gas atmosphere, but is still wetted with liquid. This liquid is removed by adjusting the gas atmosphere surrounding the membrane wall such that the partial pressure of the liquid in the gas atmosphere is lower than the vapor pressure of the liquid wetting the membrane wall. However, a purity of the so produced water is typically not sufficient for e.g. the semiconductor industry.

SUMMARY

A general object with the present technology is to provide methods and devices that can provide purified water for washing purposes in a semiconductor production line that allows for a use of smaller amounts of water.

The above object is achieved by methods and devices according to the independent claims. Preferred embodiments are defined in dependent claims.

In general words, in a first aspect, an air channel membrane distiller comprises a hot surface, a cooling section and a hydrophobic membrane. The hydrophobic membrane has pores of diameters less than 1 µm, preferably less than 500 nm and most preferably less than 100 nm. The hot surface is mechanically arranged to the hydrophobic membrane, separated by a sealed evaporation channel. A surface of the cooling section is mechanically arranged to the hydrophobic membrane separated by a sealed condensation channel. A water supply tubing is connected to a water inlet of the evaporation channel. A water discharge tubing is connected to a water outlet of the evaporation channel. A purified-water discharge tubing is connected to a water outlet of the condensation channel. A cooling equipment is arranged for cooling the surface of the cooling section to a temperature lower than a temperature of water in the evaporation channel. The air channel membrane distiller further comprises a gas supply arrangement for inert gas. The gas supply arrangement comprises a heater arranged for heating the inert gas. A gas pipe system is connected to the gas supply arrangement and is arranged to a gas inlet of the condensation channel for enabling flushing of at least the condensation channel with the inert gas.

In a second aspect, an air channel membrane distiller according to the first aspect is used of in a semiconductor production plant.

In a third aspect, a method for operating an air channel membrane distiller comprises providing water to an evaporation channel, during a purified-water production period. During the purified-water production period, a condensation channel is cooled to a temperature lower than a temperature of the water. The evaporation channel is separated from the condensation channel by a hydrophobic membrane with pores of diameters less than 1 µm, preferably less than 500 nm and most preferably less than 100 nm. Water vapour thereby passes from the evaporation channel through the hydrophobic membrane to the condensation channel. During the purified-water production period, water that is condensed in the condensation channel is discharged. The method further comprises heating of an inert gas. Upon finishing the purified-water production period, the heated inert gas is streamed through at least the condensation channel. Thereby a removal of any remaining water is caused. The heating and streaming are stopped before a next instant of a purified-water production period.

One advantage with the proposed technology is that purified water is allowed to be produced in direct connection with the site where it is going to be used and is produced on demand just in time. Other advantages will be appreciated when reading the detailed description.

BRIEF DESCRIPTION OF THE DRAWINGS

The invention, together with further objects and advantages thereof, may best be understood by making reference to the following description taken together with the accompanying drawings, in which.

DETAILED DESCRIPTION

Figure 1A:
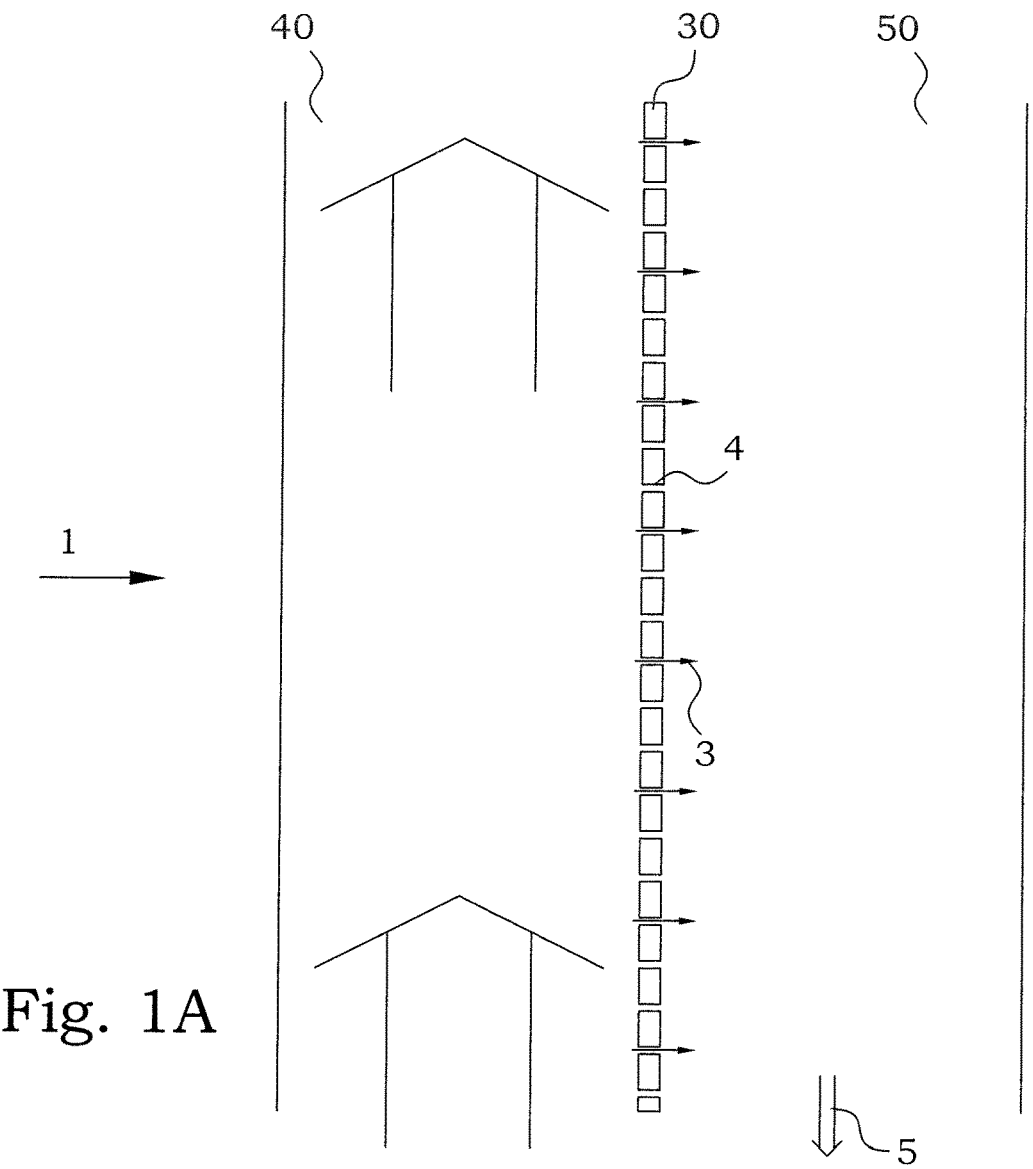
FIGS. 1A-B illustrates schematically the basic ideas of air channel membrane distilling.

Throughout the drawings, the same reference numbers are used for similar or corresponding elements.

For a better understanding of the proposed technology, it may be useful to begin with a brief overview of a new concept of using water for cleaning purposes.

As mentioned above, the general trend in prior art semiconductor production is to provide larger purified water supply devices. Since these are inconvenient to have within the clean-room environment, relatively long pipes have to be used for transporting the water to the washing sites.

It is now understood that the actual storage and transportation of purified water give rise to contaminations. Purified water that has been stored for a while in a tank becomes relatively fast less pure, only due to contamination originating from the tank itself. Likewise, the purity of water degrades quickly upon transporting the purified water in pipes, regardless of the character or material of the pipes. Some carefully selected material will of course reduce the contamination rate, but there will always be some degree of contamination.

An alternative approach is therefore to provide freshly produced purified water in the absolute vicinity of the site where it is going to be used, and furthermore provide it in an amount and at a time being in agreement with the production lines washing steps. This results in that purified water of a much higher purity is provided to the washing procedures, which has proven to reduce the needed amount of washing water considerably. By providing an extreme purity, the volumes used for washing can thus be reduced significantly.

However, this approach then relies on the availability of a specified amount of freshly produced purified water at a specified site at a specified instant. Since the washing takes place within the clean-room area of a production line, it would be beneficial if the purified water production unit itself also could be provided within the clean-room area. This puts some restraints on the useful techniques.

Membrane distillers are, as such, known since long for use of purifying water. They have so far not been used to any larger extent to produce purified water to the semiconductor industry due to the fact that typical arrangements are bulky and relatively slow compared to other alternative. However, according to the above-mentioned alternative approach, the amount of purified water for each washing step can be kept small if the provision of the purified water is matched in place and time. Prior-art membrane distillers are typically used in a continuous-running mode. In the present application, however, the need is that the ultra-pure water should be provided intermittently with relatively long inactivity periods in-between. Membrane distillers of today are, however, typically rather slow to start up and may need some internal rinsing before being able to be used in active production. Some improvements would thus be of benefit. Such improvements are provided by the ideas of the here presented technology.

Figure 1B:
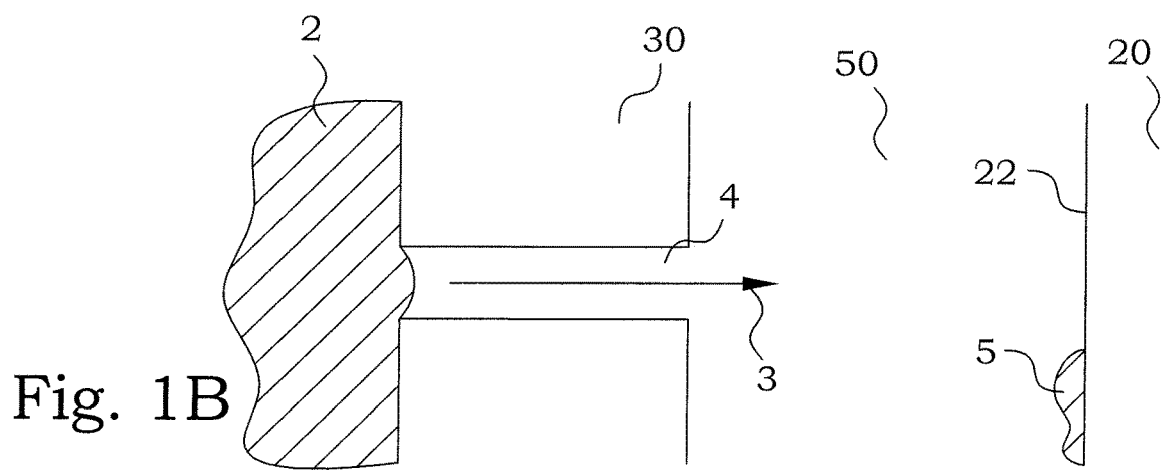

In order to understand the details of an air channel membrane distiller, the main operation ideas are first presented, in connection with FIG. 1A and FIG. 1B. An air channel membrane distiller 1 basically comprises two channels; one evaporation channel 40 and one condensation channel 50. The channels are separated by a hydrophobic membrane 30. The hydrophobic membrane 30 has pores (4), typically with a diameter less than 1 μm. Smaller pores typically give a better result in terms of purity, but will at the same time reduce the speed of production. In the view of purity quality, it is thus preferred if the pores have a diameter of less than 500 nm and most preferably less than 100 nm.

Heated water is supplied into the evaporation channel 40. The size of the pores 4 is small enough to prohibit a direct flow of water to the condensation channel 50. As seen in FIG. 1B, warm water 2 will due to the surface tension over the pore 4 not be admitted into the pore 4. However, evaporation of water vapour 3 occurs at the surface of the warm water, and this evaporated water vapour 3 is not obstructed by any surface tension and may therefore pass through the pore 4. When the water vapour 3 enters into the condensation channel 50, it will experience a cold surface, e.g. a surface 22 of a cooling section 20. The result will be that the water re-condenses into condensed water 5 on the surface 22. When the amount of condensed water 5 becomes large enough, droplets of purified water will form and fall down through the condensation channel 50 and exit the membrane distiller. This is according to most prior-art air channel membrane distillers.

When a water-production period of a prior-art air channel membrane distiller is ended, the provision of hot water is stopped and no further transport of evaporated water vapour 3 through the pores take place. The production of purified water stops. However, a certain amount of condensed water may still stick onto the surface 22. If this condensed water is allowed to remain in contact with the surface 22, contaminants will be dissolved from the surface 22 into the water 5. When the air channel membrane distiller 1 is started again, contaminated water will be provided as a start. This may be solved by either rinsing or by simply discarding the first produced volumes of water. However, such procedures will slow down the start-up times and will give rise to wastewater volumes.

Figure 2:
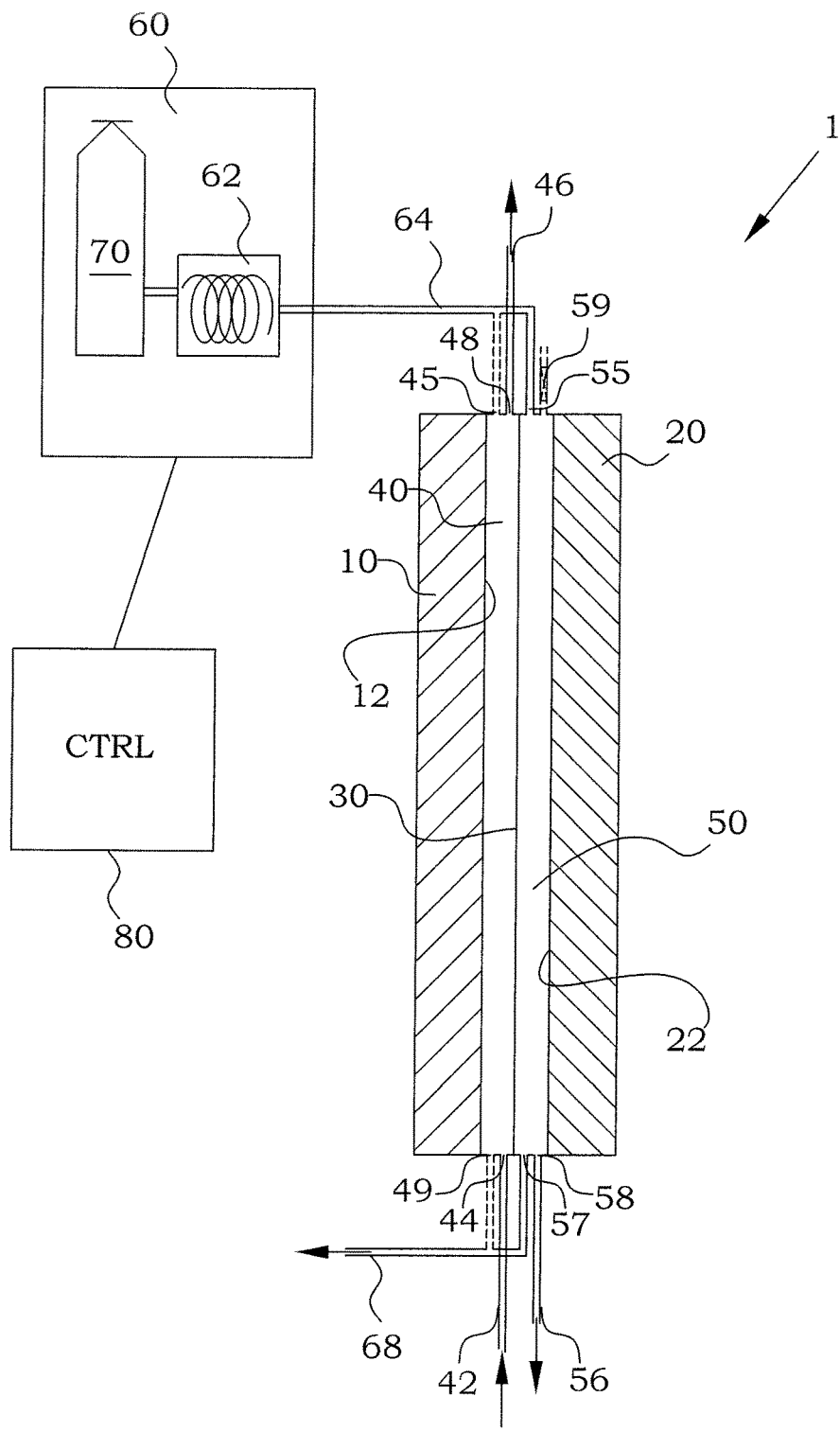
FIG. 2 illustrates schematically an embodiment of an air channel membrane distiller.

According to the technology presented here, there are proposed means to avoid such disadvantages. In FIG. 2, an embodiment of an air channel membrane distiller 1 is schematically illustrated. The air channel membrane distiller 1 comprises a heating block 10, a cooling section 20 and a hydrophobic membrane 30. In analogy with above, the hydrophobic membrane 30 comprises pores 4 of diameters less than 1 μm, preferably less than 500 nm and most preferably less than 100 nm. A hot surface 12 of the heating block 10 is mechanically arranged to the hydrophobic membrane 30 separated by a sealed evaporation channel 40. A surface 22 of the cooling section 20 is mechanically arranged to the hydrophobic membrane 30 separated by a sealed condensation channel 50.

A water supply tubing 42 is connected to a water inlet 44 of the evaporation channel 40. A water discharge tubing 46 is connected to a water outlet 48 of the evaporation channel 40. A purified-water discharge tubing 56 is connected to a water outlet 58 of the condensation channel 50. The surface 22 of the cooling section 20 is arranged, as will be further discussed below, to be cooled to a temperature lower than a temperature of water in the evaporation channel 40.

During operation, there might in some applications be a build-up of an overpressure in the condensation channel 50. Such an overpressure will counteract the entrance of the evaporated water through the pores 4. Therefore, in a preferred embodiment, the condensation channel 50 comprises a gas vent valve 59. The gas vent valve is allowed to open only during a purified-water production period.

The air channel membrane distiller 1 further comprises a gas supply arrangement 60 for inert gas 70. The inert gas is typically dry nitrogen or any noble gas. The gas supply arrangement 60 comprising a heater 62 arranged for heating the inert gas 70. A gas pipe system 64 is connected between the gas supply arrangement 60 and at least the condensation channel 50 by an inert gas inlet 55. The gas pipe system 64 is thus arranged for enabling flushing of the condensation channel 50 with the inert gas 70. The warm inert gas 70 will cause any remaining re-condensed water in the condensation channel 50 to again evaporate and follow the inert gas 70 out from the air channel membrane distiller 1 through a gas outlet 57 of the condensation channel 50 into an inert gas discharge pipe arrangement 68, thereby prohibiting any dissolution of contaminants from the surface 22. When starting production of purified water again, the condensation channel 50 is ready to provide the highest quality of purified water directly from start.

Figure 3:
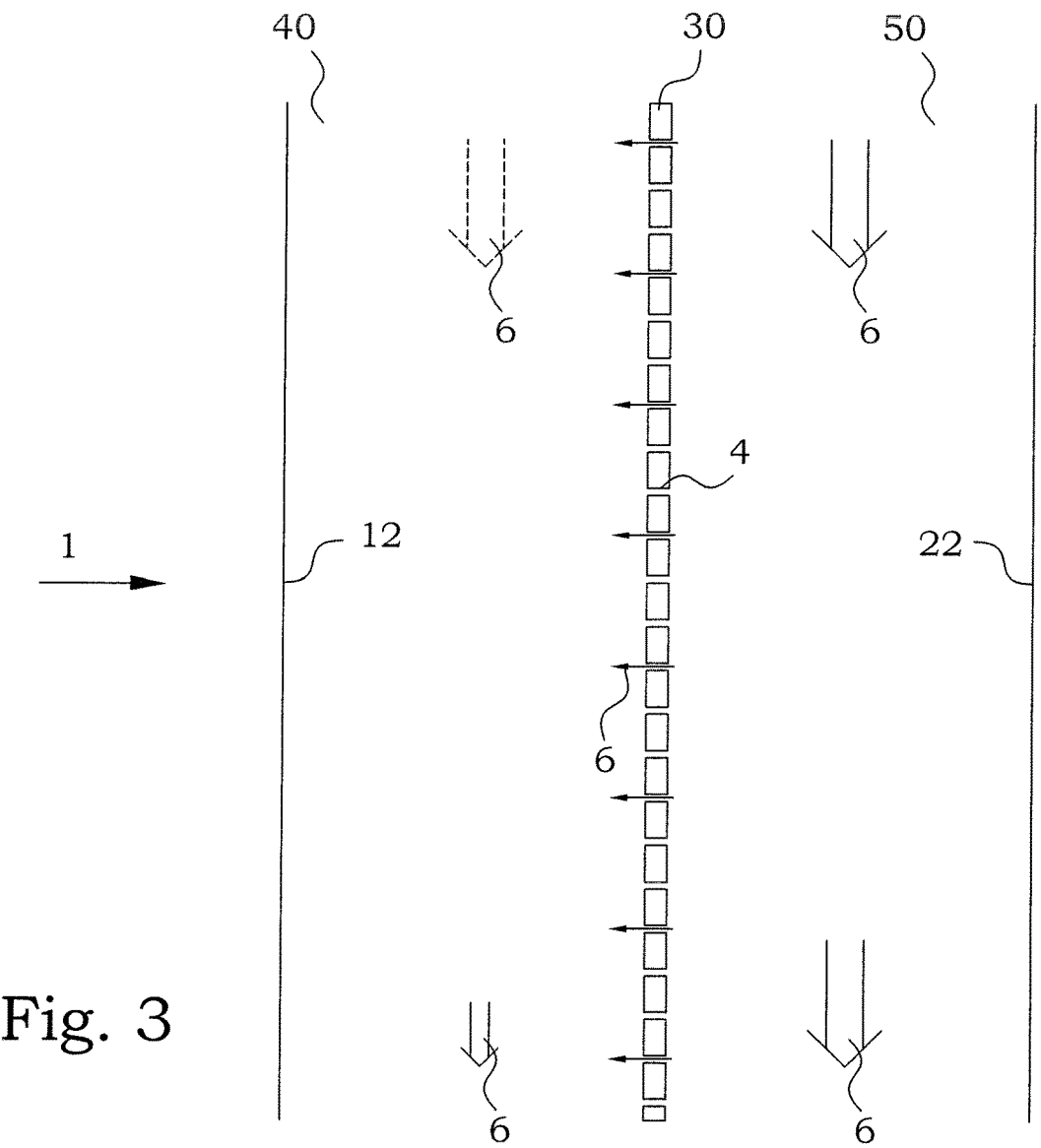
FIG. 3 illustrates schematically the introduction of hot inert gas in a condensation channel.

In FIG. 3, the situation in the air channel membrane distiller 1 just after ending the purified water production is schematically illustrated. Hot inert gas 6 is streamed through the condensation channel 50 removing any remaining water, essentially by re-evaporation. Some hot inert gas 6 does also penetrate the hydrophobic membrane 30 and exit through the evaporation channel 40. As will be discussed further below, the rate of the gas penetration may be influenced by membrane damages and/or contaminations and may therefore be used for monitoring such features.

In a particular embodiment, the flushing with dry inert gas may also be performed in the evaporation channel 40. The gas pipe system 64 is then connected to a gas inlet 45 of the evaporation channel 40, and the inert gas discharge pipe arrangement 68 is also connected to a gas outlet 47 of the evaporation channel 40. Such an arrangement could be of benefit for assisting in maintaining the operation efficiency of the pores. If contaminants are stuck at the ends of the pores at the evaporation channel site, they will stop any further transport of evaporated water through the pore and thus reduce the efficiency of the air channel membrane distiller 1. the contaminants may even remain also after the removal of the hot water. When the equipment is started again, the contaminants will again prohibit the function of the pore. By supplying hot gas through the evaporation channel, some of such contaminants may be evaporated and thus open up the pore for the next interval of use.

Returning to FIG. 2, the behaviour of the cyclic performance of the equipment is preferably performed by a controller 80. The controller 80 is arranged for, upon finishing a purified-water production period, controlling the gas supply arrangement 60 to supply the inert gas 70 by the gas pipe system 64. The controller 80 also controls the gas supply arrangement 60 to stop supply the inert gas 70 before starting a purified-water production period.

In order to dry the condensation channel 50 efficiently, there are two main properties to control. An increased temperature of the inert gas will increase the rate of removing remaining water. Likewise, an increased gas flow will also have the same effect. Anyone of these approaches, or both, can thus be controlled in order to find suitable conditions for each application. In other words, the controller 80 is arranged for controlling at least one of a gas flow rate and a gas temperature of the inert gas 70 supplied by the gas supply arrangement 60.

The main purpose of flushing the condensation channel with hot gas after use is to shorten the start-up time when a new production period is to begin. Since the general approach of providing purified water at the site, in time and in an appropriate amount is dependent on that a fast start-up is available, this flushing is advantageous.

There are also other means to reduce the start-up time. When a new purified-water production period is to begin, hot water has again to be entered into the evaporation channel. Preferably, the inlet of the hot water is performed from below, i.e. through the water supply tubing 42. The evaporation channel the starts to be filled from below and immediately, the lower parts of the hydrophobic membrane 30 starts to operate as intended. The filling of the evaporation channel 40 from below ensures that the entire evaporation channel 40 is filled without substantial remaining gas volumes trapped. Furthermore, such a complete filling can be performed without exposing the evaporation channel 40 for any excess pressure. The only pressure applied to the hydrophobic membrane 30 comes from the water pressure itself within the evaporation channel 40. Thus, the mechanical forces applied over the hydrophobic membrane 30 are minimized, which thereby minimizes the bending out of the membrane and minimizes the risks for mechanically induced damages on the membrane.

In other words, preferably, the water inlet 44 of the evaporation channel 40 is provided at a lower end of the evaporation channel 40 and the water outlet 48 of the evaporation channel 40 is provided at an upper end of the evaporation channel 40.

Figure 4:
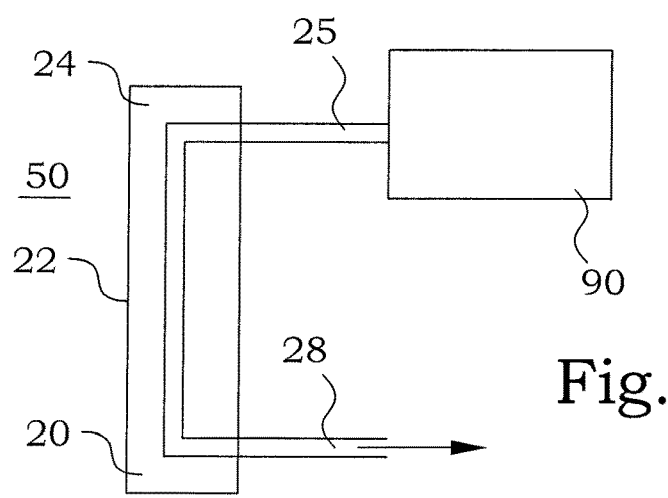
FIG. 4 illustrates schematically an embodiment of a cooling equipment.

Also other means can be taken to further speed-up the start-up procedure. With reference to FIG. 4, a cooling equipment 24 is typically arranged for cooling the surface 22 of the cooling section 20 to a temperature lower than a temperature of water in the evaporation channel. In a typical arrangement, a cooling medium supply 90 is connected with a cooling medium tubing 25 through the cooling equipment 24 and out through a cooling medium discharge tubing 28.

The cooling equipment 24 is thereby cooled by the streamed cooling media and so is the surface 22. The cooling media may be water and there may be arrangements for recycling the cooling media. However, such details are not of particular importance for the rest of the here presented technology and is therefore not further discussed. A person skilled in the art realizes several possibilities to arrange for such a cooling arrangement.

Figure 5:
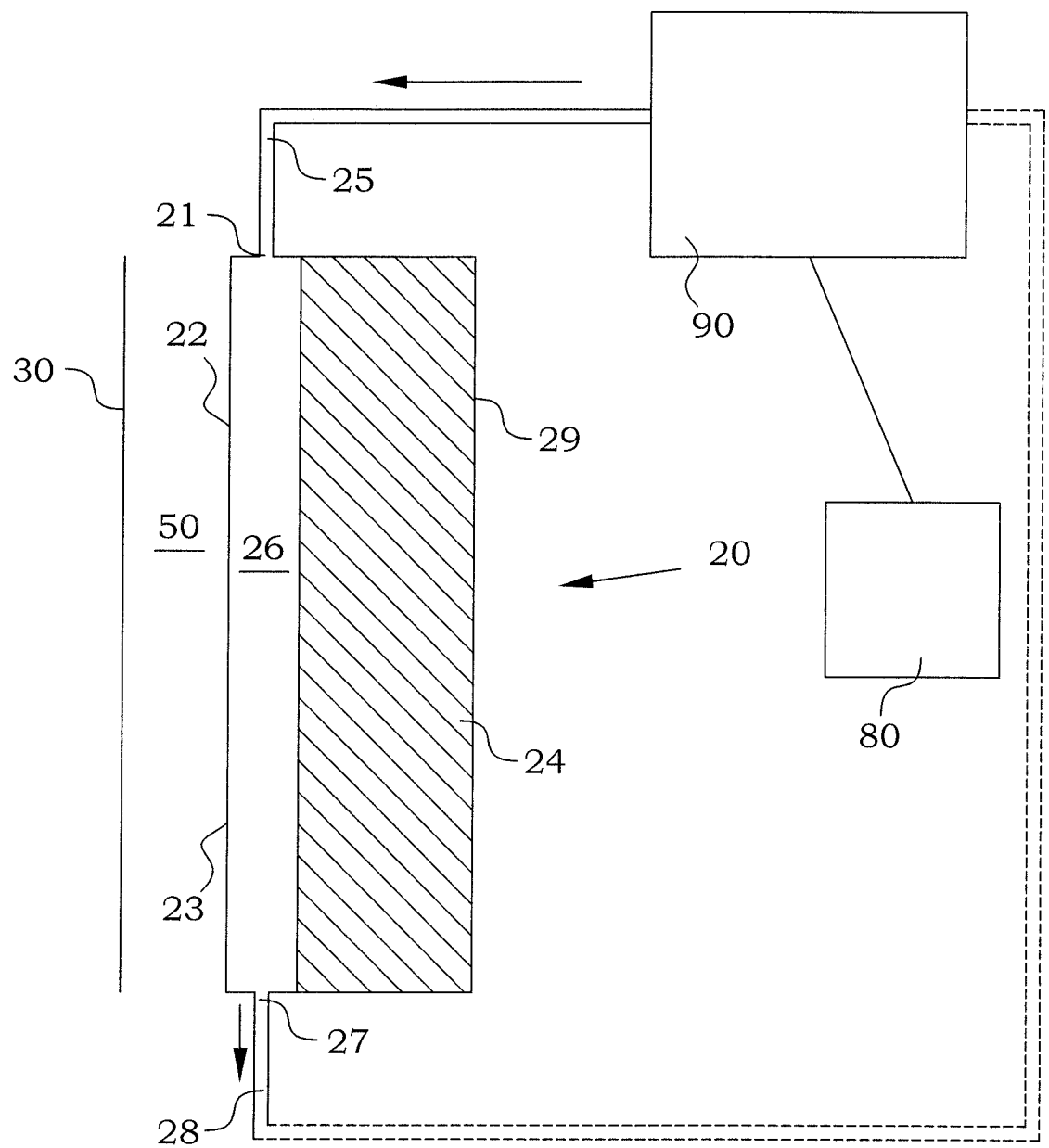
FIG. 5 illustrates schematically a further embodiment of a cooling equipment.

The cooling arrangements may also preferably be designed for enabling a fast start-up. FIG. 5 illustrates one embodiment of a cooling equipment 24 with a preferred design. In this embodiment, the cooling section 20 comprises a polymer film 23 facing the condensation channel 50. The surface 22 is thus the surface of the polymer film that is in contact with the condensation channel 50. A cooling block 29 is mechanically arranged to the polymer film 23 separated by a sealed cooling channel 26. A cooling medium supply tubing 25 is connected to an inlet 21 of the cooling channel 26. A cooling medium discharge tubing 28 is connected to an outlet 27 of the cooling channel 26.

The choice to use polymer as the material separating the cooling channel 26 and the condensation channel 50 is based on that polymers are flexible and can easily withstand minor shape changes without breaking. Also, polymer surfaces can typically be customized regarding properties such as adhesion and smoothness. Since the surface 22 is the place where re-condensation of the water vapour occurs, the properties of the polymer film 23 can preferably be adapted accordingly. In order to have a high efficiency in the cooling, it is preferable to have a thin polymer film 23. Since polymers typically have a low ability of heat conduction, it is presently believed that a thickness below 60 μm is to prefer. More preferably, a thickness of less than 40 μm and most preferably less than 30 μm is used.

Also the surface smoothness of the polymer film 23 may influence the tendency to keep water droplets at the surface 22. A smoother surface will in general increase the tendency for the droplets to flow downwards along the condensation channel, while a rougher surface instead will maintain lager droplets stationary at the surface 22. Therefore, a surface roughness of the surface 22 facing the condensation channel 50 is preferably less than 30 μm, more preferably less than 10 μm and most preferably less than 5 μm. The surface roughness is defined as a root mean square (RMS) of peaks and valleys measured in surface profiles.

The cooling medium is provided by a cooling medium supply 90 arranged according to well-known prior art techniques. Preferably, the cooling medium discharge tubing is re-connected to the cooling medium supply 90 for recirculating the cooling medium.

The supply of cooling medium is preferably synchronized with the operation cycles of the rest of the arrangement. When a purified-water production period ends and the remaining re-condensed water in the condensation channel is to be removed, it is preferable if the surface 22 is no longer cooled. This is easily arranged for by stopping the flow of the cooling medium through the cooling channel 26 and evacuating the cooling channel 26. The evacuated cooling channel 26 then also operates as a thermal insulation between the surface 22 and the cooling block 29. The temperature of the bulk cooling block 29 can then be kept during non-operation periods without significantly influencing the surface 22, which then can be brought to a warmer temperature assisting in evaporating the remaining water. Upon starting a new purified-water production period, the cooling medium can be reintroduced into the cooling channel 26 and only the thin polymer film 23 has to be cooled down. This reduces the start-up time of the arrangement.

In a preferred embodiment, this synchronized operation is managed by the same controller as is used for the hot inert gas control. In such an embodiment, a cooling medium supply 90 is connected to a cooling medium supply tubing 25. The controller 80 is then further arranged to stop any supply of cooling medium upon finishing a purified-water production period and to start supply of cooling medium upon starting a next purified-water production period.

Figure 6:
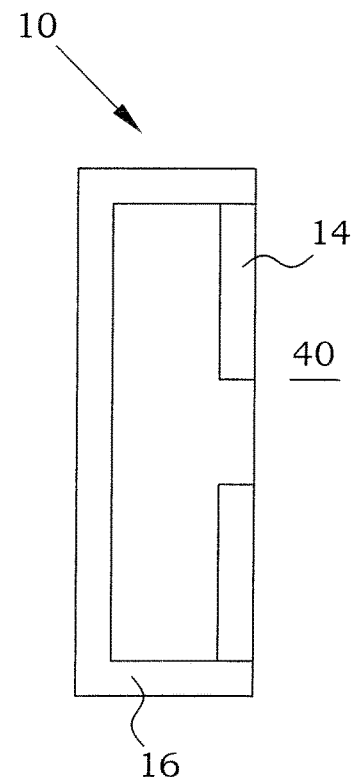
FIG. 6 illustrates schematically an embodiment of a heating block.

The start-up time is also influenced by the configuration of the evaporation channel. The heating block is provided in contact with the evaporation channel in order to assist in maintaining a high temperature of the water entered into the evaporation channel. In FIG. 6, an embodiment of a heating block 10 is schematically illustrated. In this embodiment, the heating block 10 is thermally insulated by an insulation layer 16 at the sides of the heating block 10 not facing any evaporation channel. In this embodiment, the heating block 10 comprises heating elements 14. The contact part 18 with the evaporation channel 40 assists in keeping the water at a hot temperature, thereby supporting the evaporation through the hydrophobic membrane. When purified-water production period is ended, the evaporation channel 40 is emptied from hot water and may be exposed for hot inert gas instead. By having the insulation layer 16 and furthermore preferably also heating elements 14, the heating block 10 can maintain its high temperature during the non-operational periods. This temperature maintaining only requires very low power amounts. When a new purified-water production period is to be started, the heating block 10 is already at operational temperature, which facilitates a quick start-up.

Figure 7:
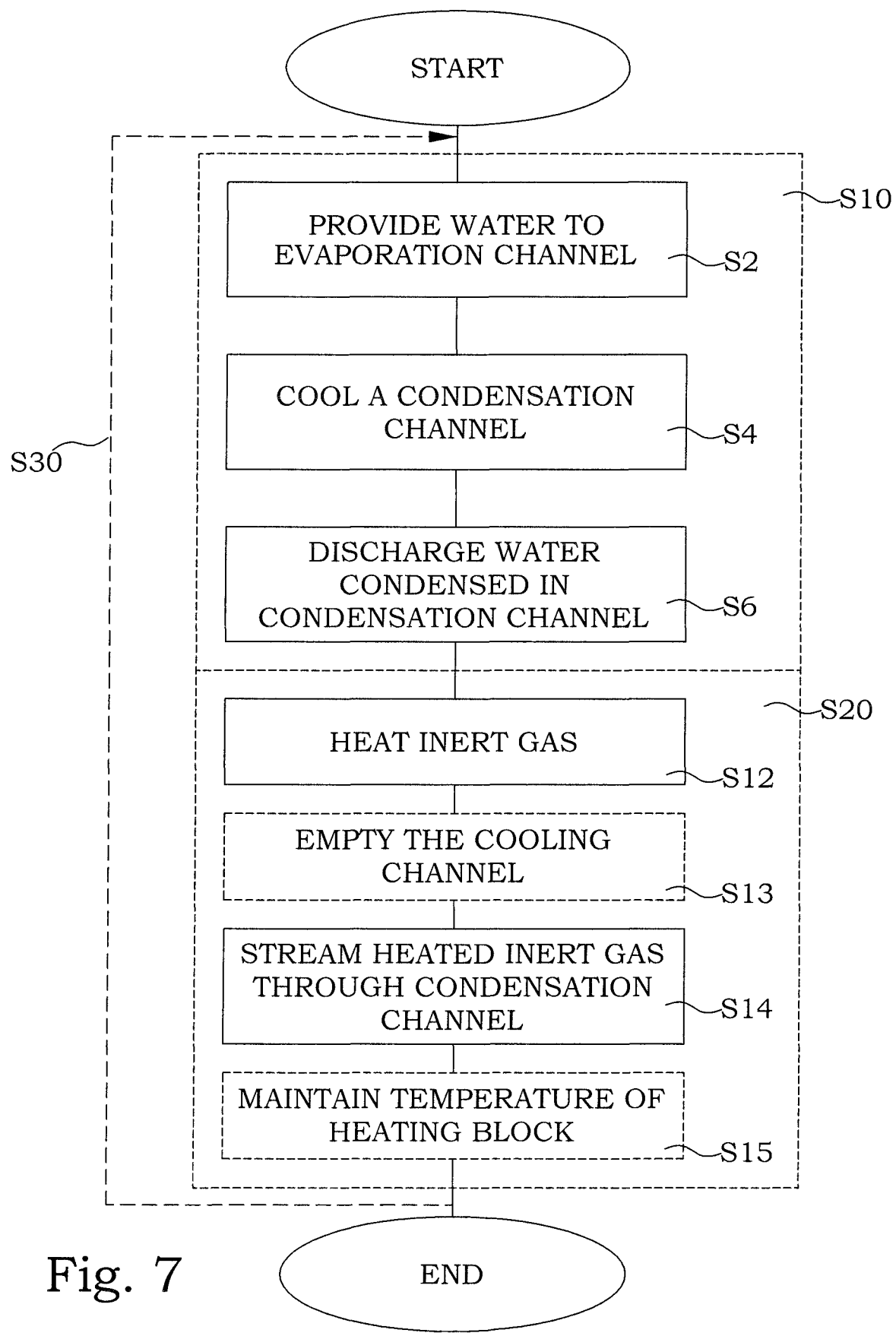
FIG. 7 is a flow diagram of steps of an embodiment of a method for operating an air channel membrane distiller.

FIG. 7 is a flow diagram of steps of an embodiment of a method for operating an air channel membrane distiller. The method can be divided into a purified-water production period S10 and a standby period S20. As illustrated by the dotted arrow S30, these periods are typically repeated. During the purified-water production period S10, water is provided in step S2 to an evaporation channel. During the purified-water production period S10, a condensation channel is cooled in step S4 to a temperature lower than a temperature of the water. The evaporation channel is separated from the condensation channel by a hydrophobic membrane with pores of diameters less than 1 μm, preferably less than 500 nm and most preferably less than 100 nm. Thereby, water vapour passes from the evaporation channel through the hydrophobic membrane to the condensation channel. In step S6, during the purified-water production period S10, water that is condensed in the condensation channel is discharged.

In step S12, an inert gas is heated. In step S14, upon finishing the purified-water production period S20, the heated inert gas is streamed in step S14 through at least the condensation channel. This thereby causes a removal of any remaining water therefrom. The heating and streaming are stopped before a next purified-water production period S20.

In one embodiment, the step S14 of streaming the heated inert gas comprises streaming the heated inert gas through the evaporation channel and the condensation channel. In a preferred embodiment, the heated inert gas has a temperature sufficient to cause dry distillation of contaminations in the evaporation channel.

In a preferred embodiment, the step S4 of cooling the condensation channel comprises streaming of a cooling medium through a cooling channel situated between a cold block and a polymer film, wherein a surface of said polymer film opposite to the cooling channel is facing the condensation channel. In a further embodiment, the streaming of the cooling medium through the cooling channel is stopped upon finishing said purified-water production period and started upon starting a next purified-water production period.

In a yet further embodiment, the method comprises the further step S13 of emptying the cooling channel upon finishing the purified-water production period.

In one embodiment, the method comprises the further step S15 of maintaining a temperature of a heating block in contact with the evaporation channel between purified-water production periods.

A set of an evaporation channel, a condensation channel and a hydrophobic membrane can be seen as a distiller cell provided between a cold and a warm surface. The capacity of such a cell depends for instance on the area of the hydrophobic membrane. However, since the hydrophobic membrane is very thin, large area hydrophobic membranes are more likely to bend and/or be damaged. In order to increase the capacity, it is instead possible to increase the total membrane area by using a plurality of cells.

Furthermore, the warm and cold zones of the cells can also be shared between the cells such that e.g. a same cooling section could be used by two neighbouring cells. It may therefore in certain embodiments be advantageous to arrange the cells in alternating operation direction. This means that the water vapour passing the hydrophobic membrane moves in opposite directions through neighbouring hydrophobic membranes.

Figure 8:
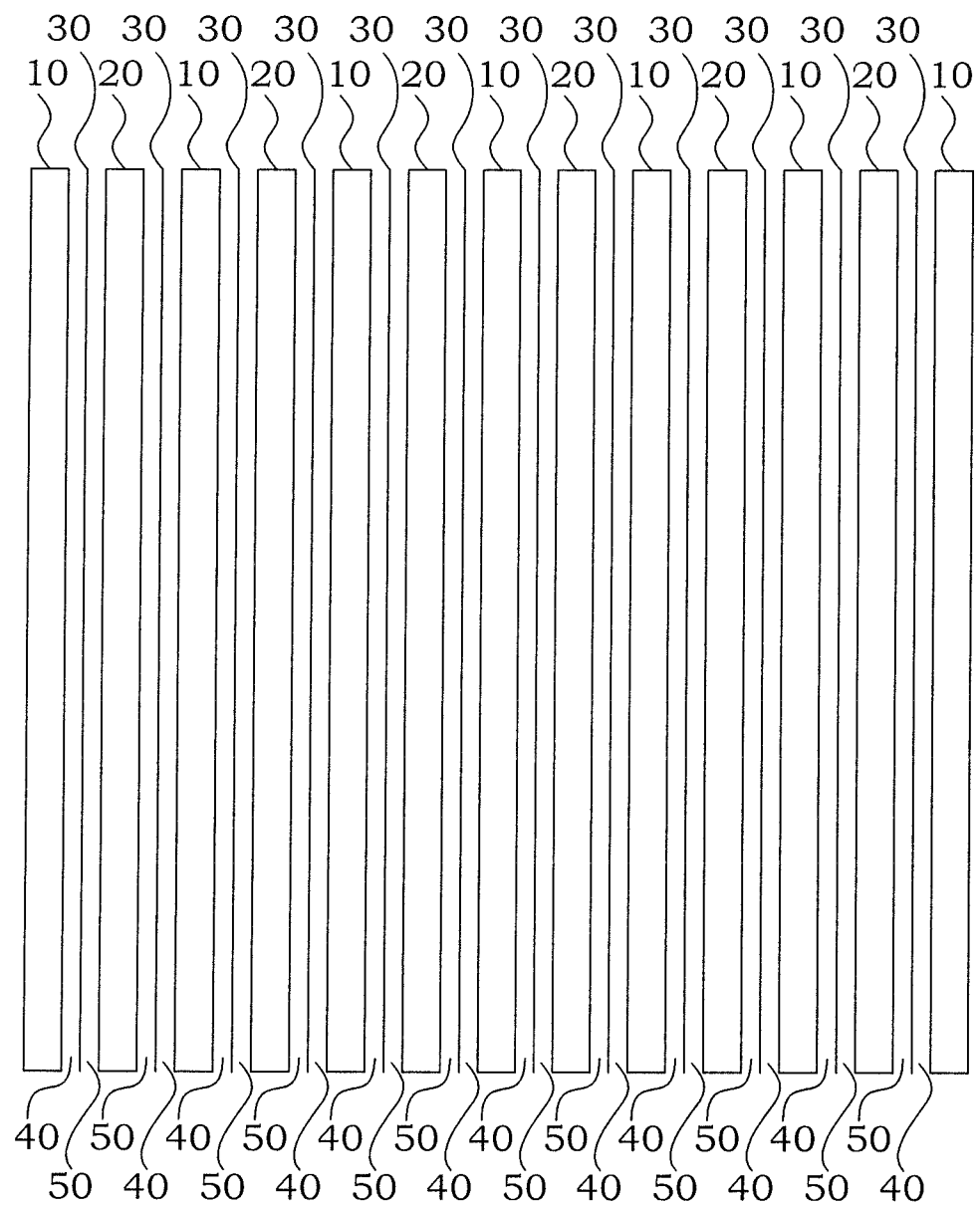
FIG. 8 illustrates schematically an embodiment of an air channel membrane distiller having a plurality of evaporation channels and condensation channels.

In other words, the air channel membrane distiller comprises in a preferred embodiment a plurality of evaporation channels and a plurality of condensation channels provided and separated by respective hydrophobic membranes. FIG. 8 illustrates schematically one embodiment of such a set-up. In this embodiment, a plurality of heating blocks 10 and a plurality of cooling sections 20 are provided in an alternating manner. In other words, one heating block 10 is provided between each pair of cooling sections 20 and one cooling section 20 is provided between each pair of heating blocks 10. Between each neighbouring cooling section 20 and heating block 10, a hydrophobic membrane 30 is provided. This gives rise to evaporation channels 40 and condensation channels 50. There are thus condensation channels 50 on each side of each cooling section 20 and evaporation channels 40 on each side of each heating block 10, except the end ones. This set-up gives an efficient use of the provided heat and cold.

Figure 9:
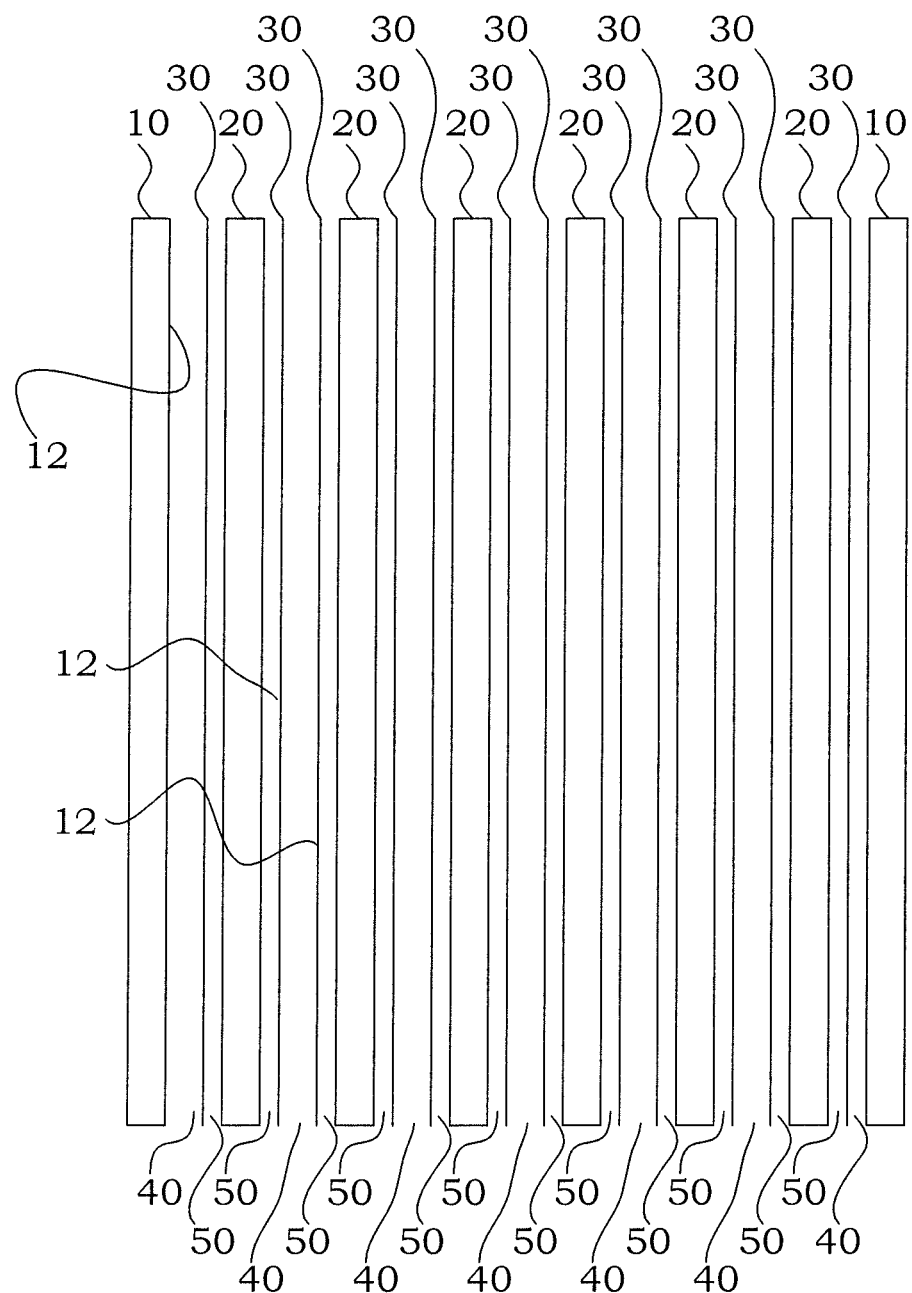
FIG. 9 illustrates schematically another embodiment of an air channel membrane distiller having a plurality of evaporation channels and condensation channels.
Figure 9:
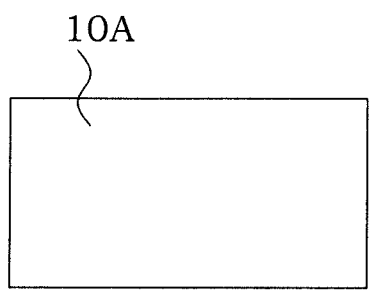

In FIG. 9, another embodiment is shown, which also uses the setup where the air channel membrane distiller comprises a plurality of evaporation channels and a plurality of condensation channels and separated by respective hydrophobic membranes. This embodiment relies on that the water provided into evaporation channel is pre-heated and hot enough to cause the requested evaporation through the pores of the hydrophobic membranes 30. The heating block 10 is then removed, except at the ends, and the hot surface 12 is instead constituted by the hydrophobic membrane 30 of a neighbouring cell. In other words, the evaporation channels 40 are defined by two hydrophobic membranes 30, facing two different cooling blocks 20. The hydrophobic membrane 30 on one side of the evaporation chamber 40 then operates as a hot surface for the hydrophobic membrane 30 on the opposite side of the evaporation chamber 40. Optionally, an external heating block 10A can be provided, which is used to heat the water before it is entered into the evaporation channels 40.

The mechanical construction of the air channel membrane distiller can be designed in many different ways. One presently preferred approach is to provide the different channels, foils and membranes by use of thin polymer frames and/or plates. Such an embodiment is schematically illustrated in FIGS. 10A-G.

Figure 10A:
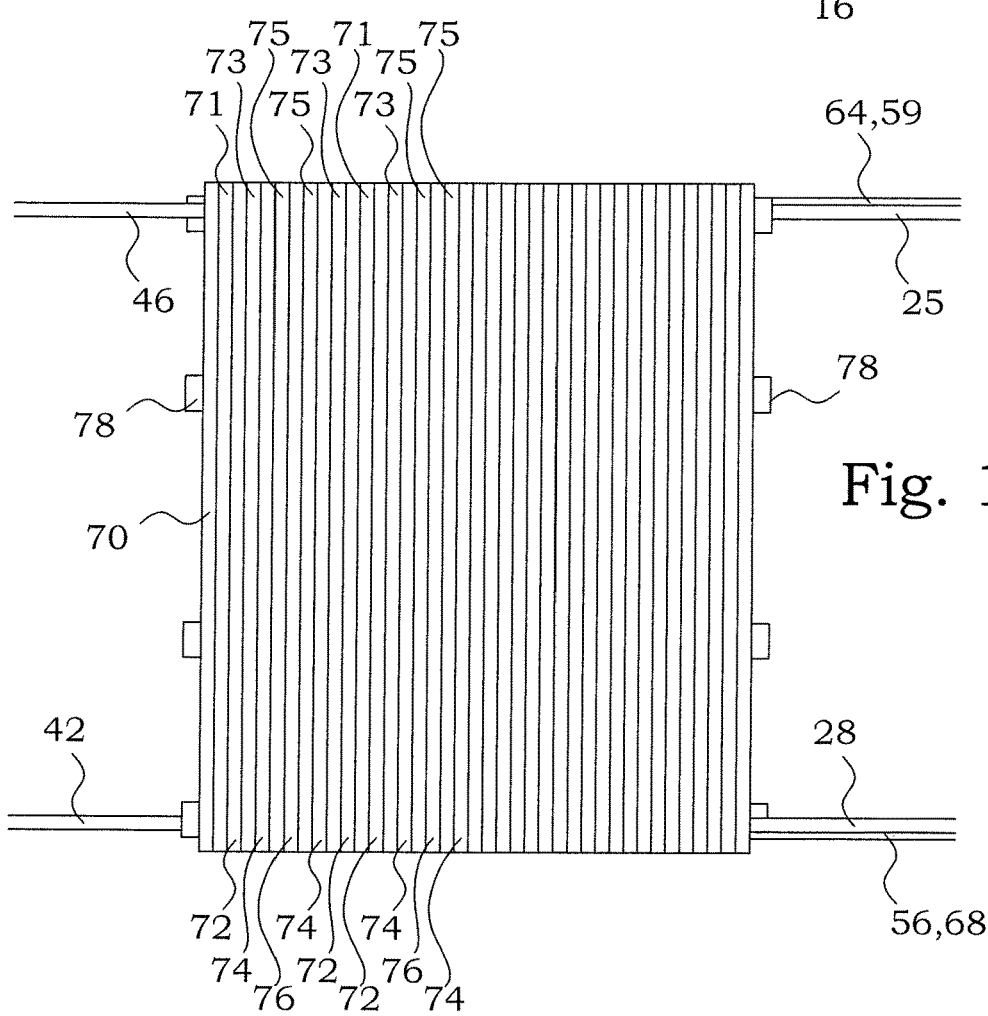
FIG. 10A illustrates schematically an embodiment of an air channel membrane distiller based on a stack of polymer frames and plates.

In FIG. 10A, the assembly is illustrated from the side. Different polymer frames and/or plates 71-76 are stacked and sealed to each other. Each different polymer frames and/or plates 71-76 has its own purpose, which will be explained further below. The inlets and outlets of hot water 42, 46, cooling medium, 25, 28 purified water, 56 hot inert gas 64, 68 and gas vent 59 are provided through the stack of polymer frames and/or plates 71-76. An end polymer plate 70 closes all other inlets or outlets that do not exit through that end. The polymer frames and/or plates 71-76 are tightened against each other by screw arrangements 78 through the polymer frames and/or plates 71-76.

Figure 10B:
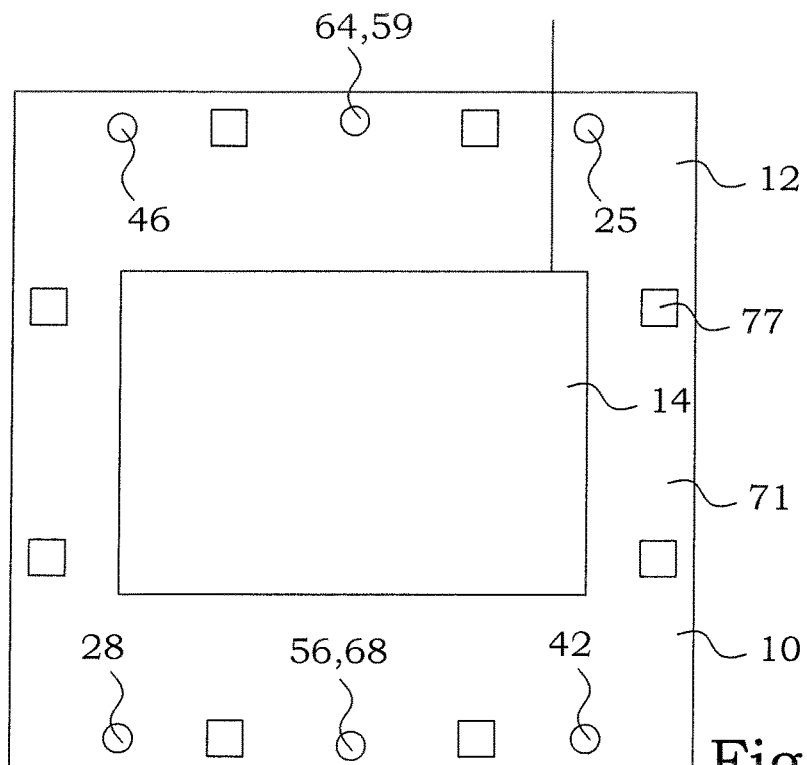
FIGS. 10B-G illustrate schematically individual polymer frames and plates of the embodiment of FIG. 10A.

In FIG. 10B, the polymer plate 71 is illustrated in a perpendicular view. The inlets and outlets are here shown as holes in the polymer plate 71. Furthermore, holes 77 for mounting the screw arrangements are also provided. A heating element 14 is provided in the polymer plate 71. The surface of the polymer plate 71 constitutes the hot surface 12 of the heating block 10.

Figure 10C:
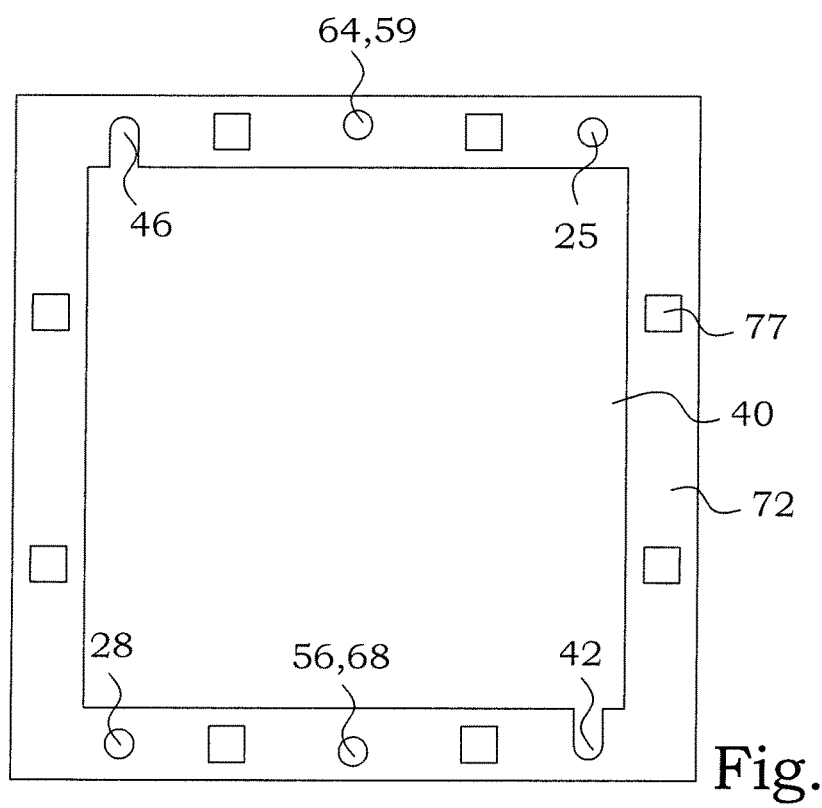

In FIG. 10C, the polymer frame 72 is illustrated in a perpendicular view. The inlets and outlets are here shown as holes in the polymer frame 72. The hole in the middle of the frame constitutes the evaporation channel 40. There are also connections between the evaporation channel 40 and the inlet 42 and outlet 46. Thus, hot water entering through the inlet 42 can flow into the evaporation channel 40 and fill it up. When the water level reaches the top, it can flow out through the outlet 46.

Figure 10D:
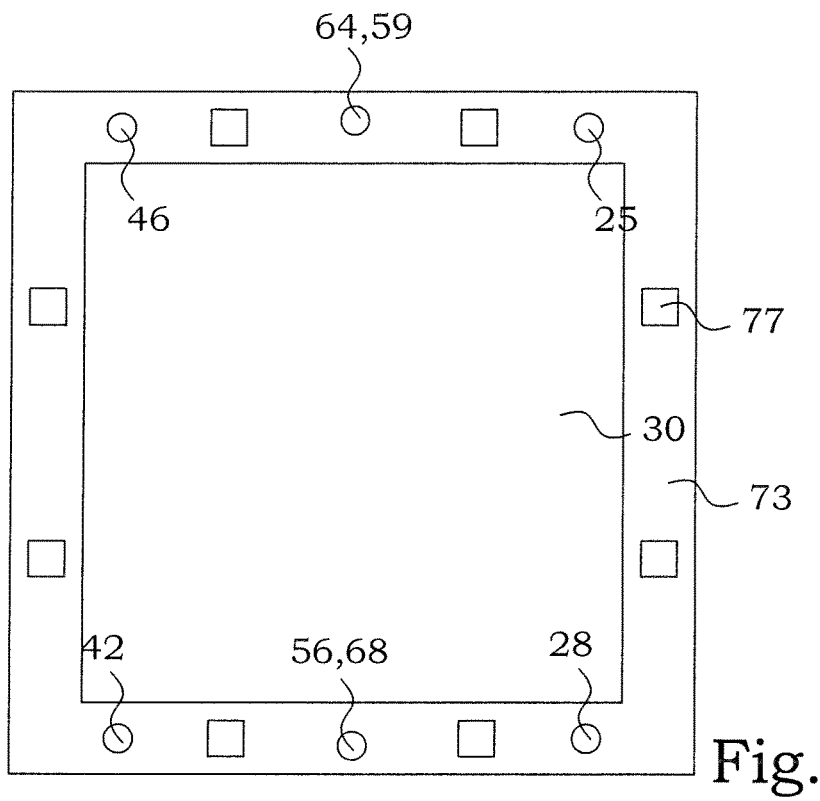

In FIG. 10D, the polymer frame 73 is illustrated in a perpendicular view. The inlets and outlets are here shown as holes in the polymer frame 73. This polymer frame 73 holds the hydrophobic membrane 30. The hydrophobic membrane 30 is preferably welded towards the polymer frame 73.

Figure 10E:
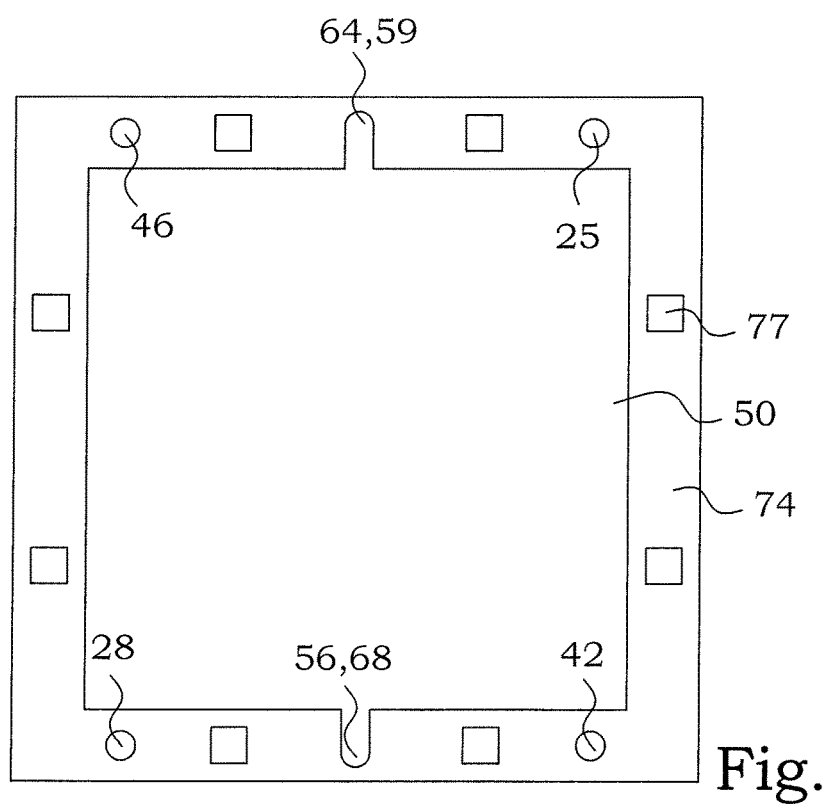

In FIG. 10E, the polymer frame 74 is illustrated in a perpendicular view. The inlets and outlets are here shown as holes in the polymer frame 74. The hole in the middle of the frame constitutes the condensation channel 50. There is a connection between the condensation channel 50 and the purified-water discharge tubing 56. This tubing is in the present embodiment also used as the inert gas discharge pipe arrangement 68. There is also a connection between the condensation channel 50 and the gas pipe system 64. This tubing is in the present embodiment also used to connect to the gas vent valve 59.

Figure 10F:
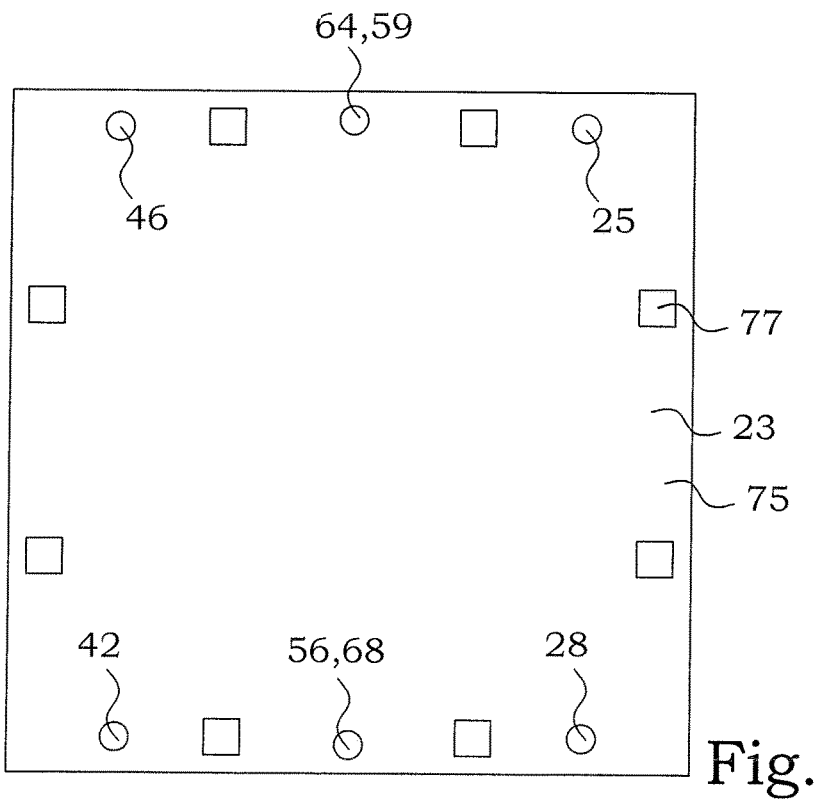

In FIG. 10F, the polymer plate 75 is illustrated in a perpendicular view. The inlets and outlets are here shown as holes in the polymer plate 75. Furthermore, holes 77 for mounting the screw arrangements are also provided. The surface of the polymer plate 75 constitutes the thin polymer film 23 defining the cooling channel. As was discussed above, the surface intended to be facing the condensation channel should be as smooth as possible, while the surface intended to be facing the cooling channel may be rougher.

Figure 10G:
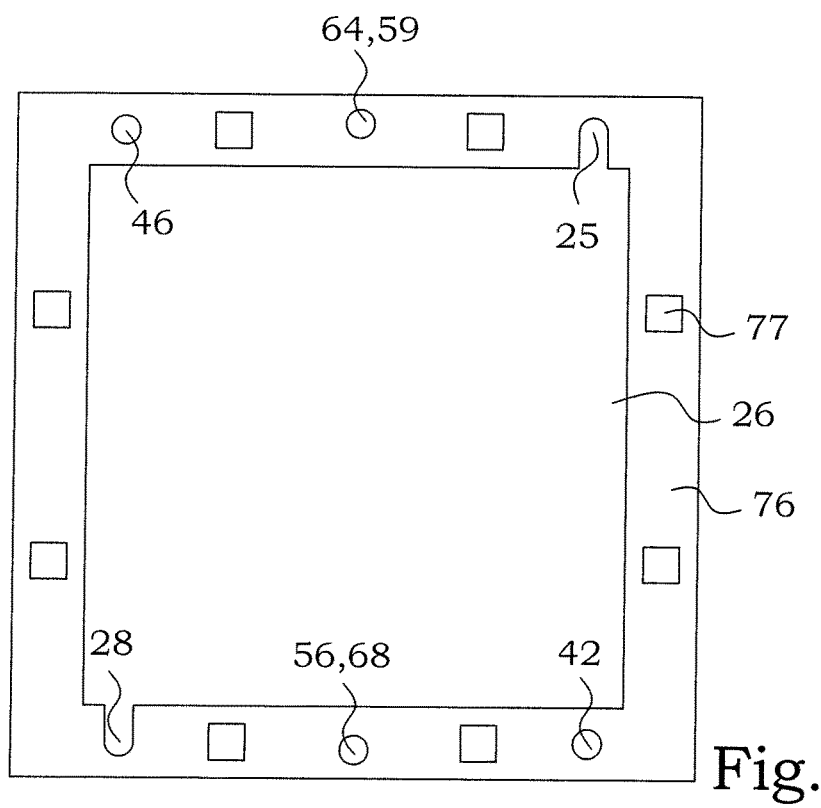

In FIG. 10G, the polymer frame 76 is illustrated in a perpendicular view. The inlets and outlets are here shown as holes in the polymer frame 76. The hole in the middle of the frame constitutes the cooling channel 26. There are connections between the cooling channel 26 and the cooling medium supply tubing 25 and the cooling medium discharge tubing 28.

By stacking the polymer frames and/or plates 71-76 in a proper order and seal the polymer frames and/or plates 71-76 against each other, the evaporation channel 40, the condensation channel 50 and the cooling channel 26 can be formed. By using a polymer in the polymer frames and/or plates 71-76 that provides some elasticity in the surface, the polymer frames and/or plates 71-76 may be sealed against each other without use of any additional sealings. Alternatively, sealings can be used between the polymer frames and/or plates 71-76.

In a test equipment, polyvinylidene fluoride (PVDF) has been used with excellent results as the frame/plate polymer. A tight seal was formed by the frames against each other, at the same time as the frames managed to maintain the membrane and polymer film in an essentially undistorted manner.

In a preferred embodiment, distance tubes are inserted through the holes 77 for mounting the screw arrangements. The length of such tubes should exactly correspond to the sum of the thicknesses of the polymer frames and/or plates 71-76. Fastening the stack of polymer frames and/or plates 71-76 through such distance tubes will ensure that the polymer frames and/or plates 71-76 are firmly held against each other without any excess force causing risks for deformation and/or leaks.

In other words, in one embodiment, the evaporation channel, the hydrophobic membrane, the hot surface, the cooling section and the condensation channel are provided in stacks of polymer frames and/or plates.

The condition of the hydrophobic membrane is important for the efficiency of the purification operation. Pores can be blocked by contaminations in the hot water, which gives a reduced purification rate. There may also be cracks or larger holes caused by particles in the water or mechanical wear. Such damages may risk the entire purification process.

Figure 11:
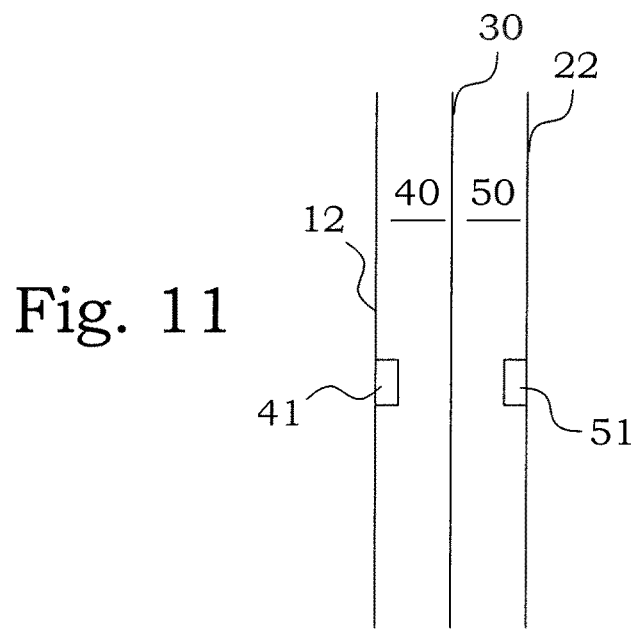
FIG. 11 illustrates schematically pressure sensors in an evaporation channel and a condensation channel.

In one embodiment, the inert gas arrangements can be utilized for achieving an indication of such malfunctions. FIG. 11 illustrates schematically a part embodiment of an air channel membrane distiller in which an evaporation-side pressure sensor 41 and a condensation-side pressure sensor 51 are provided in the evaporation channel 40 and condensation channel 50, respectively. Alternatively, the evaporation-side pressure sensor 41 and/or the condensation-side pressure sensor 51 may be provided in a volume having a same pressure as in the evaporation channel 40 and condensation channel 50, respectively. In other words, the evaporation-side pressure sensor 41 and/or the condensation-side pressure sensor 51 may be provided in a gas commuting volume.

Figure 12:
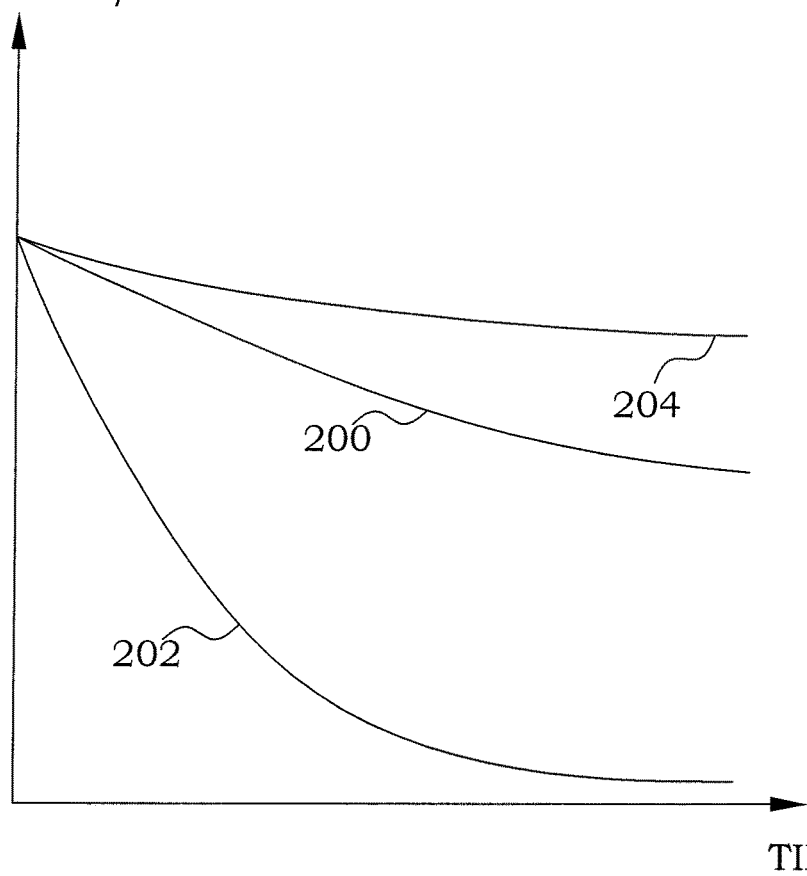
FIG. 12 is a diagram schematically illustrating pressure time evolutions for volumes in contact with fully operational, blocked and damages hydrophobic membranes, respectively.

The pressure difference over the hydrophobic membrane 30 can thus be monitored. When flowing hot inert gas through at least the condensation channel upon ending a water-purification operation period, gas of a certain pressure is provided to the condensation channel. Some gas will pass through the hydrophobic membrane 30 into the evaporation chamber, thereby increasing the pressure in the evaporation chamber. Such a back-streaming gas flow is easily calculated or measured for fully functionable hydrophobic membrane 30. If the gas supply to the condensation channel is stopped, the back-streaming gas flow will also reduce the pressure within the condensation channel. By monitoring the individual pressures or the pressure difference across the hydrophobic membrane 30, a certain time evolution will be found. In FIG. 12, the curve 200 schematically illustrates a possible time evolution of a pressure difference over a fully operable hydrophobic membrane 30.

If pores of the hydrophobic membrane 30 are blocked, the gas flow through the hydrophobic membrane 30 will also be reduced, and consequently, the time evolution of the pressure difference will be altered. Such a situation may give a curve looking e.g. as curve 204 in the diagram of FIG. 12.

If cracks or large holes are present in the hydrophobic membrane 30, the gas flow through the hydrophobic membrane 30 will instead be increased. The time evolution of the pressure difference will be altered also in such a case. Such a situation may give a curve looking e.g. as curve 202 in the diagram of FIG. 12.

It is thus possible to use the behaviour of the time evolution of the pressure difference over the hydrophobic membrane 30 to distinguish between a fully functionable hydrophobic membrane 30, a hydrophobic membrane 30 having a large degree of blocked pores and a damaged hydrophobic membrane 30.

It is also possible to perform a similar evaluation only using one pressure sensor. If the pressure sensor is provided in contact with the condensation channel, the pressure decrease with time can be mapped in the same manner, and any disfunction of the hydrophobic membrane can be analysed. If the single pressure sensor is provided in contact with the evaporation chamber, the time evolution will instead show a pressure increase. However, also such a time evolution can be used for evaluating the status of the hydrophobic membrane.

Thus, one embodiment of a method for operating an air channel membrane distiller comprises the further step of measuring a pressure in the evaporation channel and/or a pressure in the condensation channel during provision of the heated inert gas.

Therefore, in one embodiment, the evaporation-side pressure sensor 41 and/or a condensation-side pressure sensor 51 are connected to a controller, preferably the same controller as for the hot inert gas control. The controller is arranged to follow pressures in volumes in contact with the hydrophobic membrane with time.

Thus, one embodiment of a method for operating an air channel membrane distiller comprises the further steps of obtaining a pressure in a volume in contact with the hydrophobic membrane and/or a pressure difference over said hydrophobic membrane, following the pressure and/or pressure difference with time and analysing a status of the hydrophobic membrane based on a time evaluation of the pressure and or pressure difference over the hydrophobic membrane.

As was mentioned further above, some contaminations that may block the pores may be evaporated by flooding also the evaporation channel by hot inert gas. Such flooding may therefore be performed according to the status of the hydrophobic membrane, in particular if the analysis of the pressure time evolution indicates that there are blocked pores. Thus, one embodiment of a method for operating an air channel membrane distiller comprises the further step of controlling the steps of heating the inert gas and streaming the heated inert gas in dependence of the hydrophobic membrane status.

One general advantage of the air channel membrane distilling is that purified water of very high quality can be obtained in a one-step process also from heavily contaminated feed water. The limit of contamination level is typically set by the probability for contaminations to block the pores and thereby reduce the efficiency of the purification. In order to avoid blocking of the pores, at least to some degree, it is advantageous to have some streaming of the hot water within the evaporation channel. However, in many cases, the hot water leaving the evaporation channel is typically still clean enough to be used as a feed water again. It is thus possible to reuse the water in the water discharge tubing to be re-entered into the evaporation channel again. One advantage by doing this is that the water in the discharge tubing already has been heated, and any temperature loss during the flow through the evaporation channel is typically easily regenerated with small energy requirements.

Figure 13:
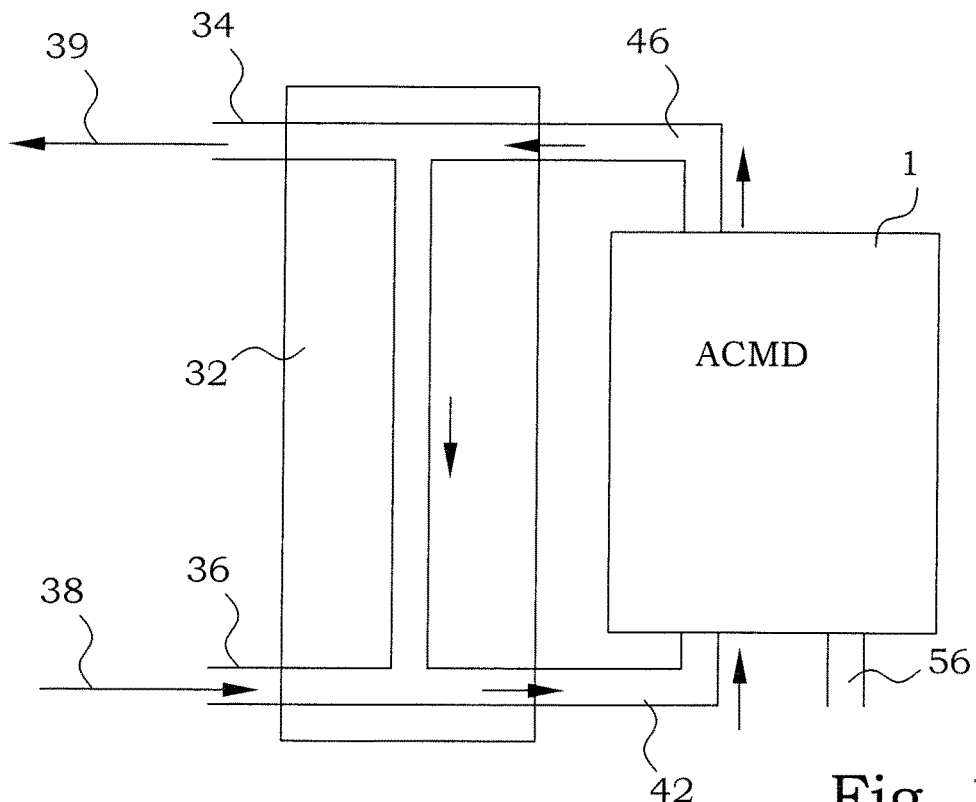
FIG. 13 illustrates schematically re-circulation of water in an air channel membrane distiller.

This is schematically illustrated in FIG. 13. The air channel membrane distiller (ACMD) 1 has a water supply tubing 42, a purified-water discharge tubing 56 and a water discharge tubing 46. Water from the water discharge tubing 46 enters a bleed arrangement 32. In the bleed arrangement 32 a part of the water from water discharge tubing 46 is removed as wastewater 39 through a wastewater outlet 34. The remaining part, typically the main part, is circulated back to the water supply tubing 42. In order to compensate for the bleed of water and for the produced purified water, new water 38 is added through a water addition tubing 36. The wastewater 39 may comprise relatively high degrees of contaminants and different kinds of hazardous substance processes may be used for ensuring a safe treatment of this wastewater. Such processes are however outside the scope of the present ideas.

In other words, in one embodiment, the water discharge tubing 46 is connected to the water supply tubing 42 for re-circulating at least a part of the water discharged from the evaporation channel 40. In a further embodiment, the water discharge tubing 46 comprises a bleed arrangement 34, arranged to remove a part 39 of the water discharged from the evaporation channel 40. The water supply tubing 42 then comprises a water addition tubing 36 arranged to add new water 38 into the air channel membrane distiller 1.

In one embodiment of a method for operating an AMCD, the method comprises the further step of re-circulating at least a part of water discharged from the evaporation channel to be supplied to the evaporation channel again. In a further embodiment, the method comprises the further steps of removing a part of the water discharged from the evaporation channel to be discarded and adding new water into the evaporation channel.

The present technical ideas are based on an assumption that the present air channel membrane distiller should be able to use in a semiconductor production plant. It has the advantage of being able to provide purified water at the washing sites in a semiconductor production, in an amount and at a specific time adapted to the requirements of the washing.

The water that has been used in the washing of semiconductor products indeed comprises different kinds of contaminants and particles. However, the general level of contaminants is typically still relatively low. It is thus perfectly possible to reuse the water that has been used in a washing step as feed water for the purification process. The contaminants from the washing will indeed enter into the ACMD but will be enriched in the water exiting in the water discharge tubing, and eventually be removed by the bleed arrangement.

Figure 14:
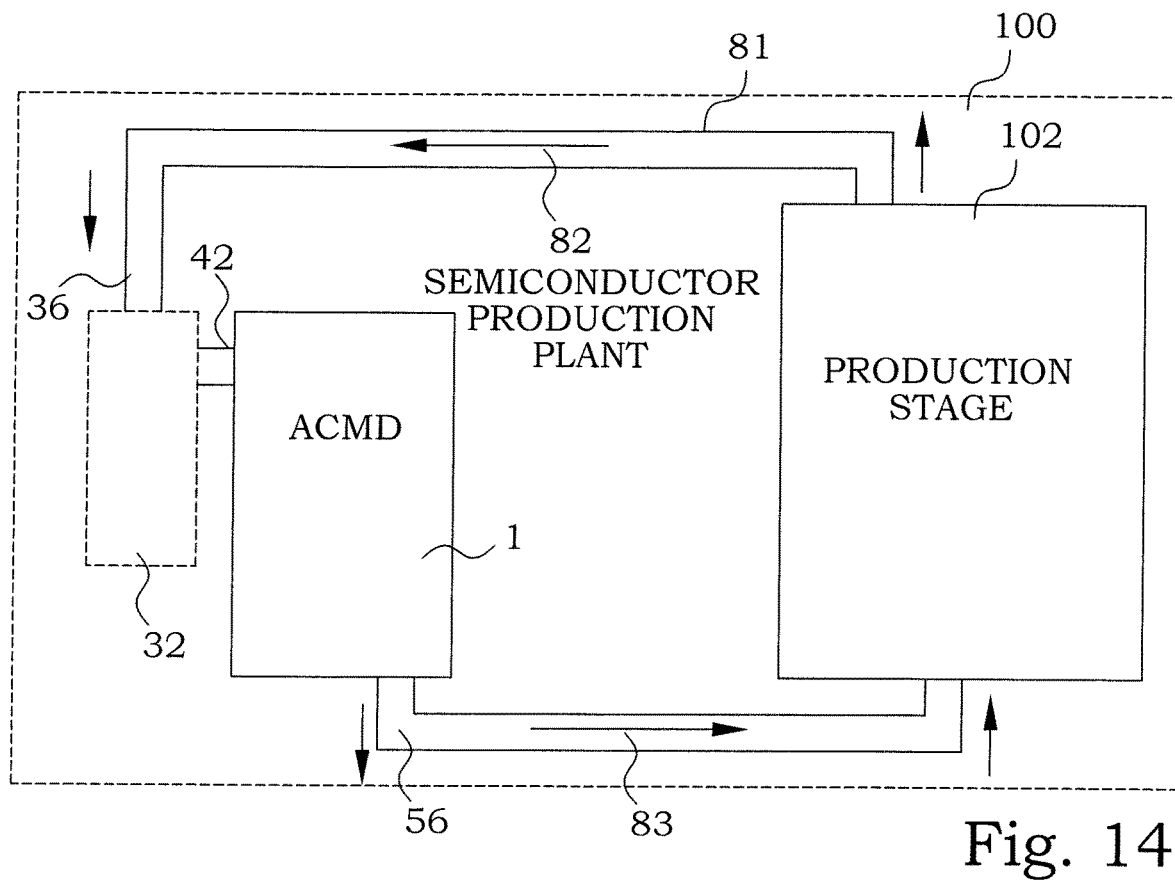
FIG. 14 illustrates schematically re-use of water in a semiconductor production plant.

FIG. 14 illustrates schematically an embodiment where an air channel membrane distiller 1 is used in a semiconductor production plant 100. Purified water 83 is provided through the purified-water discharge tubing 56 of the ACMD 1 and is entered into a washing procedure in a production stage 102. The transport distance between the air channel membrane distiller 1 and the production stage 102 is preferably short and the purified water is produced on demand at a specified time and in a specified amount. Used washing water 82 exits the production stage 102 and is reconducted back to the ACMD 1 in a wash water pipe 81. This water is in this embodiment re-entered into the purification process as new water 36 into the bleed arrangement 32 and then by the water supply tubing 42 back into the ACMD 1. In this way, most of the water is re-circulated within the semiconductor plant 100. The only part of the water that has to be replaced by fresh water from outside is the bleed-out wastewater, which is a significantly smaller volume compared to the wastewater volumes of today.

In other words, in one embodiment, the new water comprises water having been used for washing processes in semiconductor production.

In one embodiment of a method for operating an AMCD, the new water comprises water having been used for washing processes in semiconductor production.

The embodiments described above are to be understood as a few illustrative examples of the present invention. It will be understood by those skilled in the art that various modifications, combinations and changes may be made to the embodiments without departing from the scope of the present invention. In particular, different part solutions in the different embodiments can be combined in other configurations, where technically possible. The scope of the present invention is, however, defined by the appended claims.

The invention claimed is:

1. An air channel membrane distiller, comprising:
    a hot surface;
    a cooling section;
    a hydrophobic membrane with pores of diameters less than 1 µm;
    wherein said hot surface being mechanically arranged to said hydrophobic membrane separated by a sealed evaporation channel;
    wherein a surface of said cooling section being mechanically arranged to said hydrophobic membrane separated by a sealed condensation channel;
    a water supply tubing connected to a water inlet of said sealed evaporation channel;
    a water discharge tubing connected to a water outlet of said sealed evaporation channel;
    a purified-water discharge tubing connected to a water outlet of said sealed condensation channel; and
    a cooling equipment arranged for cooling said surface of said cooling section to a temperature lower than a temperature of water in said sealed evaporation channel,
    a gas supply arrangement for inert gas;
    said gas supply arrangement comprising a heater arranged for heating said inert gas;
    a gas pipe system connected to said gas supply arrangement and arranged to a gas inlet of said sealed condensation channel for enabling flushing of at least said sealed condensation channel with said inert gas; and
    a controller, said controller being arranged for, upon finishing a first purified-water production period, controlling said gas supply arrangement to supply said inert gas by said gas pipe system and controlling said gas supply arrangement to stop supply said inert gas before starting a second purified-water production period.

2. The air channel membrane distiller according to claim 1, further comprising a heating block comprising said hot surface.

3. The air channel membrane distiller according to claim 1, wherein said gas pipe system is further connected to a gas inlet of said sealed evaporation channel.

4. The air channel membrane distiller according to claim 1, wherein said water inlet of said sealed evaporation channel is provided at a lower end of said sealed evaporation channel and said water outlet of said sealed evaporation channel is provided at an upper end of said sealed evaporation channel.

5. The air channel membrane distiller according to claim 4, wherein a cooling medium supply connected to a cooling medium supply tubing, and wherein said controller being further arranged to stop any supply of cooling medium upon finishing a third purified-water production period and to start supply of cooling medium upon starting a next purified-water production period.

6. The air channel membrane distiller according to claim 1, wherein said cooling section comprises:
   a polymer film facing said sealed condensation channel,
   a cooling block being mechanically arranged to said polymer film separated by a sealed cooling channel,
   a cooling medium supply tubing connected to an inlet of said sealed cooling channel;
   a cooling medium discharge tubing connected to an outlet of said sealed cooling channel.

7. The air channel membrane distiller according to claim 1, wherein said sealed condensation channel comprises a gas vent valve, being allowed to open only during a fourth purified-water production period.

8. The air channel membrane distiller according to claim 1, wherein said air channel membrane distiller a plurality of evaporation channels and a plurality of condensation channels and separated by respective hydrophobic membranes.

9. The air channel membrane distiller according to claim 1, wherein said sealed evaporation channel, said hydrophobic membrane, said hot surface, said cooling section and said sealed condensation channel are provided in stacks of polymer frames and/or plates.

10. The air channel membrane distiller according to claim 1, wherein said water discharge tubing is connected to said water supply tubing for re-circulating at least a part of the water discharged from the sealed evaporation channel.

11. The air channel membrane distiller according to claim 10, wherein
   said water discharge tubing comprises a bleed arrangement, arranged to remove a part of the water discharged from the sealed evaporation channel, and
   said water supply tubing comprising a water addition tubing arranged to add new water into the air channel membrane distiller.

12. A use of an air channel membrane distiller in a semiconductor production plant, said channel membrane comprising:
   a hot surface;
   a cooling section;
   a hydrophobic membrane with pores of diameters less than 1 µm;
   wherein said hot surface being mechanically arranged to said hydrophobic membrane separated by a sealed evaporation channel;
   wherein a surface of said cooling section being mechanically arranged to said hydrophobic membrane separated by a sealed condensation channel;
   a water supply tubing connected to a water inlet of said sealed evaporation channel;
   a water discharge tubing connected to a water outlet of said sealed evaporation channel;
   a purified-water discharge tubing connected to a water outlet of said sealed condensation channel; and
   a cooling equipment arranged for cooling said surface of said cooling section to a temperature lower than a temperature of water in said sealed evaporation channel;
   a gas supply arrangement for inert gas;
   said gas supply arrangement comprising a heater arranged for heating said inert gas;
   a gas pipe system connected to said gas supply arrangement and arranged to a gas inlet of said sealed condensation channel for enabling flushing of at least said sealed condensation channel with said inert gas; and
   a controller, said controller being arranged for, upon finishing a first purified-water production period, controlling said gas supply arrangement to supply said inert gas by said gas pipe system and controlling said gas supply arrangement to stop supply said inert gas before starting a second purified-water production period;
   passing purified water directly from said purified-water discharge tubing into a production stage of a semiconductor production plant.

13. A method for operating an air channel membrane distiller, comprising the steps of:
   providing, during a purified-water production period, water to an evaporation channel;
   cooling, during said purified-water production period, a condensation channel to a temperature lower than a temperature of said water;
   said evaporation channel being separated from said condensation channel by a hydrophobic membrane with pores of diameters less than 1 µm;
   whereby water vapour passes from said evaporation channel through said hydrophobic membrane to said condensation channel; and
   discharging, during said purified-water production period, water being condensed in said condensation channel;
   heating an inert gas; and
   streaming, upon finishing said purified-water production period, said heated inert gas through at least said condensation channel, thereby causing a removal of any remaining water;
   said heating and streaming being stopped before a next said purified-water production period.

14. The method according to claim 13, wherein said step of streaming said heated inert gas comprises streaming said heated inert gas through said evaporation channel and said condensation channel.

15. The method according to claim 13, wherein said step of cooling said condensation channel comprises streaming of a cooling medium through a cooling channel situated between a cooling block and a polymer film, wherein a surface of said polymer film opposite to said cooling channel is facing said condensation channel.

16. The method according to claim 15, wherein said streaming of said cooling medium through said cooling channel is stopped upon finishing said purified-water production period and started upon starting a next said purified-water production period.

17. The method according to claim 16, comprising the further step of emptying said cooling channel upon finishing said purified-water production period.

18. The method according to claim 13, comprising the further step of measuring at least one of a pressure in said evaporation channel and a pressure in said condensation channel during provision of said heated inert gas.

19. The method according to claim 18, comprising the further steps of obtaining at least one of a pressure in a volume in contact with said hydrophobic membrane and a pressure difference over said hydrophobic membrane, following said at least one of a pressure in a volume in contact with said hydrophobic membrane and a pressure difference over said hydrophobic membrane with time and analysing a status of said hydrophobic membrane based on a time evaluation of said at least one of a pressure in a volume in contact with said hydrophobic membrane and a pressure difference over said hydrophobic membrane.

20. The method according to claim 13, comprising the further step of recirculating at least a part of water discharged from said evaporation channel to be supplied to said evaporation channel again.

\* \* \* \* \*